(12) United States Patent
Nakanishi et al.

(10) Patent No.: US 7,217,475 B2
(45) Date of Patent: May 15, 2007

(54) NON-AQUEOUS ELECTROLYTE SECONDARY BATTERY

(75) Inventors: Naoya Nakanishi, Kobe (JP); Kouichi Satoh, Kobe (JP); Hideki Kitao, Kobe (JP); Hiroyuki Akita, Kobe (JP); Atsuhiro Funahashi, Toyonaka (JP); Toshiyuki Nohma, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 551 days.

(21) Appl. No.: 10/682,297

(22) Filed: Oct. 10, 2003

(65) Prior Publication Data

US 2004/0142234 A1 Jul. 22, 2004

(30) Foreign Application Priority Data

Oct. 10, 2002 (JP) ............................. 2002-297738

(51) Int. Cl.
*H01M 4/58* (2006.01)

(52) U.S. Cl. ............................. 429/231.95; 429/231.8; 429/223; 429/224; 429/231.3

(58) Field of Classification Search ................ 429/223, 429/224, 231.3, 231.8, 231.95
See application file for complete search history.

(56) References Cited

U.S. PATENT DOCUMENTS

| | | |
|---|---|---|
| 6,436,577 B1 | 8/2002 | Kida et al. |
| 6,544,682 B1 | 4/2003 | Takami et al. |
| 2002/0061443 A1* | 5/2002 | Nakanishi et al. ............ 429/223 |
| 2002/0197534 A1* | 12/2002 | Fukuda et al. ............ 429/231.4 |

FOREIGN PATENT DOCUMENTS

| | | |
|---|---|---|
| EP | 0 808 798 | 11/1997 |
| EP | 0-942-484 A1 | 9/1999 |
| EP | 1-049-189 A1 | 11/2000 |
| EP | 1 052 712 | 11/2000 |
| EP | 1-143-549 A2 | 10/2001 |
| EP | 1-179-869 A2 | 2/2002 |
| EP | 1-189-299 A2 | 3/2002 |
| EP | 1 193 782 | 4/2002 |
| EP | 1-143-549 A3 | 12/2004 |
| EP | 1-179-869 A3 | 8/2005 |
| JP | 05-006766 A | 1/1993 |
| JP | 08-213015 A | 8/1996 |
| JP | 09-293537 A | 11/1997 |
| JP | 10-092429 A | 4/1998 |
| JP | 11-199211 | 7/1999 |
| JP | 11-354118 A | 12/1999 |
| JP | 11-354122 | 12/1999 |
| JP | 3024636 | 1/2000 |
| JP | 2002-100358 | 4/2002 |
| JP | 2002-110253 * | 4/2002 |
| JP | 1193782 A2 * | 4/2002 |
| JP | 2002-175810 A | 6/2002 |
| WO | WO 98/57386 A1 | 12/1998 |
| WO | 2000-340232 A | 12/2000 |

OTHER PUBLICATIONS

Tanaka, T. et al. "Year 2000 R&D status of large-scale Lithium ion secondary batteries in the national project of Japan", vol. 97-98, Jul. 2001, pp. 2-6.
Park, Sung-Chul et al. "The elevated temperature performance of $LiNi_{1-x}Co_xO_2$ (X=0.2 and 1)", Journal of Power Sources 107 (2002) 42-47.
French Search Report dated Jan. 24, 2006, issued in corresponding to French Application No. 0406107.
French Search Report dated Jan. 25, 2006, issued in corresponding to French Application No. 0406108.
Japanese Office Action dated Aug. 8, 2006 corresponding to Japanese Application No. 2002-297738.

* cited by examiner

*Primary Examiner*—Bruce F. Bell
(74) *Attorney, Agent, or Firm*—Westerman, Hattori, Daniels & Adrian, LLP.

(57) ABSTRACT

A non-aqueous electrolyte secondary battery is provided with a positive electrode, a negative electrode, a separator interposed between the positive electrode and the negative electrode, and a non-aqueous electrolyte, wherein positive electrode active material is a mixture of lithium-manganese composite oxide having spinel structure represented by a general formula $Li_{1+z}Mn_2O_4$ (wherein a relationship $0 \leq z \leq 0.2$ is satisfied) and lithium-transition metal composite oxide represented by the general formula $LiNi_{1-x-y}Co_xMn_yO_2$ (wherein the relationships $0.5<x+y<1.0$ and $0.1<y<0.6$ are satisfied), and negative electrode active material is graphite coated with low crystalline carbon where whole or a part of a surface of first graphite material as a substrate is coated with second carbon material which is lower in crystallinity compared with the first graphite material.

9 Claims, 4 Drawing Sheets

NON-AQUEOUS ELECTROLYTE SECONDARY BATTERY

BACKGROUND OF THE INVENTION

1. Field of the Invention

The present invention relates generally to a non-aqueous electrolyte secondary battery provided with a positive electrode, a negative electrode, a separator interposed between the positive electrode and the negative electrode, and a non-aqueous electrolyte, and particularly, to a non-aqueous electrolyte secondary battery using mixture of lithium-manganese composite oxide having spinel structure and lithium-transition metal composite oxide containing nickel and cobalt as positive electrode active material in the positive electrode, which is featuring controlled decrease in capacity and high rate discharge characteristics after charge/discharge cycles.

2. Description of the Related Art

Recently, as one of advanced secondary batteries featuring high power and high energy density, non-aqueous electrolyte secondary batteries of high electromotive force, using a non-aqueous electrolyte solution, which are charged/discharged making use of oxidation and reduction of lithium, and featuring light weight, high capacity, excellent charge/discharge cycle characteristics have come into practical use.

In such non-aqueous electrolyte secondary batteries, lithium-transition metal composite oxides including lithium-cobalt composite oxide such as $LiCoO_2$, lithium-nickel composite oxide such as $LiNiO_2$, and lithium-manganese composite oxide having spinel structure such as $LiMn_2O_4$ are generally used as a positive electrode active material in the positive electrode.

Where the lithium-manganese composite oxide having the spinel structure such as $LiMn_2O_4$ is used, thermal stability is higher compared with the cases where the lithium-cobalt composite oxide such as $LiCoO_2$ or the lithium-nickel composite oxide such as $LiNiO_2$ is used, however, there have remained problems that the capacity is decreased, hence the non-aqueous electrolyte secondary batteries having high capacity are not attained, and storage characteristics and charge/discharge cycle characteristics are degraded.

Therefore, in recent years, there has been proposed the use of mixture of the lithium-manganese composite oxide having the spinel structure such as $LiMn_2O_4$ and the lithium-transition metal composite oxide such as $LiNiO_2$, to increase the capacity of the non-aqueous electrolyte secondary batteries, and to improve the storage characteristics and the charge/discharge cycle characteristics under high temperature conditions (refer to Japanese Patent No. 3024636, Japanese Patent Publication 2002-100358 and Japanese Patent Publication 2002-110253, for instance).

Unfortunately, however, in the non-aqueous electrolyte secondary batteries using the positive electrode prepared by applying the mixture of the lithium-manganese composite oxide having the spinel structure such as $LiMn_2O_4$ and the lithium-transition metal composite oxide such as $LiNO_2$ as the positive electrode active material on a positive electrode current collector, a layer of the positive electrode active material becomes hard, and flexibility of the electrode is degraded. Therefore, there have remained problems that the positive electrode active material comes off from the positive electrode current collector, thus the battery capacity is decreased by expansion/shrinkage of the positive electrode active material during charge/discharge.

Especially in recent years, the above-mentioned non-aqueous electrolyte secondary batteries have been used in various ways. Where, for instance, the non-aqueous electrolyte secondary batteries are used in electromobiles, the charge/discharge at high current is repeatedly carried out in short time, thus, in the non-aqueous electrolyte secondary batteries using the positive electrode active material, the battery capacity is remarkably decreased and the charge/discharge cycle characteristics is degraded.

The above-mentioned non-aqueous electrolyte secondary batteries have generally used graphite as negative electrode active material in negative electrodes.

Unfortunately, however, where the charge/discharged is repeatedly carried out to the non-aqueous electrolyte secondary batteries using graphite as the negative electrode active material in addition to the positive electrode active material which is the mixture of the lithium-manganese composite oxide having the spinel structure such as $LiMn_2O_4$ and the lithium-transition metal composite oxide such as $LiNiO_2$, particularly where the charge/discharge at high current is repeatedly carried out in short time, there have remained problems that internal resistance in the non-aqueous electrolyte secondary batteries steeply increases and high rate discharge characteristics is remarkably degraded, by deterioration of the graphite as the negative electrode active material and the like.

SUMMARY OF THE INVENTION

An object of the present invention is to prevent decrease in battery capacity and high rate discharge characteristics after charge/discharge cycles in a non-aqueous electrolyte secondary battery provided with a positive electrode, a negative electrode, a separator interposed between the positive electrode and the negative electrode, and a non-aqueous electrolyte, wherein positive electrode active material in the positive electrode is mixture of lithium-manganese composite oxide having spinel structure such as $LiMn_2O_4$ and lithium-transition metal composite oxide containing nickel and cobalt.

A non-aqueous electrolyte secondary battery according to a first aspect of the invention is provided with a positive electrode, a negative electrode, a separator interposed between the positive electrode and the negative electrode, and a non-aqueous electrolyte, wherein positive electrode active material in the positive electrode is a mixture of lithium-manganese composite oxide having spinel structure represented by a general formula $Li_{1+z}Mn_2O_4$ (wherein a relationship $0 \leq z \leq 0.2$ is satisfied) and the lithium-transition metal composite oxide represented by the general formula $LiNi_{1-x-y}Co_xMn_yO_2$ (wherein the relationships $0.5 < x+y < 1.0$ and $0.1 < y < 0.6$ are satisfied), and graphite coated with low crystalline carbon where whole or a part of a surface of first graphite material as a substrate is coated with second carbon material which is lower in crystallinity compared with the first graphite material is used as negative electrode active material in the negative electrode.

Where, as suggested by the non-aqueous electrolyte secondary battery of the first aspect of the invention, the graphite coated with low crystalline carbon is used as the negative electrode active material, insertion and separation of lithium ions are smoothly carried out for the effect of the low crystalline carbon on the surface, compared with use of graphite as the negative electrode active material.

Where only the lithium-manganese composite oxide having the spinel structure is used as the positive electrode active material in the positive electrode, crystal strain occurs in high voltage region, and the lithium-manganese composite oxide having the spinel structure is degraded during repedated charge/discharge, whereas where, as suggested by the non-aqueous electrolyte secondary battery of the first aspect of the invention, the mixture of the lithium-manganese composite oxide having the spinel structure and the lithium-transition metal composite oxide is used as the positive electrode active material, the occurrence of the crystal strain in high voltage region is prevented, and the insertion and the separation of the lithium ions are stably and smoothly carried out, thus degradation of the positive electrode active material during the repeated charge/discharge is prevented.

Where, as suggested by the non-aqueous electrolyte secondary battery of the first aspect of the invention, the mixture of the lithium-manganese composite oxide having the spinel structure and the lithium-transition metal composite oxide is used as the positive electrode active material, and the graphite coated with low crystalline carbon where the surface is coated with the low crystalline carbon is used as the negative electrode active material, the insertion and the separation of the lithium ions are smoothly carried out, and the degradation of the positive electrode active material and the negative electrode active material is prevented even during the repeated charge/discharge at high current in short time, thus the decrease in the capacity and the degradation of the high rate discharge characteristics of the non-aqueous electrolyte secondary battery after charge/discharge cycles is prevented.

The graphite coated with low crystalline carbon where the surface is coated with the low crystalline carbon as the negative electrode active material may be obtained by dry process, wet process, liquid-phase process, vapor-phase process, partial vapor-phase process, and so on.

The aforesaid graphite coated with low crystalline carbon where the surface is coated with the low crystalline carbon preferably has an intensity ratio (IA/IB) which is an intensity IA of 1350/cm based on an intensity IB of 1580/cm, as measured by Raman spectroscopy, in a range of 0.2 to 0.3. A peak in 1580/cm originates in a laminate having hexagonal symmetry which is similar to graphite structure, while the peak in 1350/cm originates in low crystalline structure in which the crystal structure of carbon is disordered. The higher value of IA/IB is, the larger the proportion of the low crystalline carbon on the surface is. Where the value of IA/IB is less than 0.2, the proportion of the low crystalline carbon on the surface of graphite is lowered, accordingly, receptibility of the lithium ions is not fully improved, while where the value of IA/IB is more than 0.3, the amount of the low crystalline carbon becomes large and the proportion of graphite lowers, accordingly the battery capacity is decreased.

Where specific surface area of the negative electrode active material is less than 2.5 $m^2/g$, a reactive area decreases, thus the insertion and the separation of the lithium ions are not smoothly carried out, whereas where the specific surface area is more than 10 $m^2/g$, a side reaction with the non-aqueous electrolyte solution is likely to occur, and the capacity decreases. Therefore, the negative electrode active material having the specific surface area in a range of 2.5 to 10 $m^2/g$ is preferably used.

In applying the negative electrode active material to a negative electrode current collector with a binding agent and rolling the negative electrode active material to prepare the negative electrode, where bulk density of the negative electrode active material is less than 0.3 $g/cm^3$, the negative electrode active material cracks during the rolling, and there appear many parts which are not coated with the low crystalline carbon, thus the aforesaid effects can not be attained. Therefore, the negative electrode active material having the bulk density of more than 0.3 $g/cm^3$ is preferably used.

In the preparation of the negative electrode, where filling density of the negative electrode active material filled on the negative electrode current collector is less than 1.1 $g/cm^2$, contact between the negative electrode active material is degraded and the charge/discharge characteristics is degraded, whereas where the filling density is more than 1.5 $g/cm^2$, influence of expansion/shrinkage of the negative electrode during the charge/discharge of the non-aqueous electrolyte secondary battery becomes greater, and the negative electrode active material is likely to come off from the negative electrode current collector. Therefore, the filling density of the negative electrode active material is preferably set in the range of 1.1 to 1.5 $g/cm^2$.

A non-aqueous electrolyte secondary battery according to a second aspect of the invention is provided with a positive electrode in which a layer containing positive electrode active material is formed on a positive electrode current collector, a negative electrode, a separator interposed between the positive electrode and the negative electrode, and a non-aqueous electrolyte, wherein the positive electrode active material in the positive electrode is a mixture of lithium-manganese composite oxide having spinel structure represented by a general formula $Li_{1+z}Mn_2O_4$ (wherein a relationship $0 \leq z \leq 0.2$ is satisfied) and lithium-transition metal composite oxide represented by the general formula $LiNi_{1-x-y}Co_xMn_yO_2$ (wherein the relationships $0.5<x+y<1.0$ and $0.1<y<0.6$ are satisfied), and a ratio (b/a) which is thickness (b) of the separator based on the thickness (a) of the layer containing the positive electrode active material is in a range of 0.15 to 0.9.

In the non-aqueous electrolyte secondary battery according to the second aspect of the invention, the ratio (b/a) which is the thickness (b) of the separator based on the thickness (a) of the layer containing the positive electrode active material formed on the positive electrode current collector is set in the range of 0.15 to 0.9. If the value of b/a is less than 0.15, the thickness of the separator based on the layer containing the positive electrode active material becomes so thin and flexibility of the layer containing the positive electrode active material is so low that the separator can not absorb expansion/shrinkage of the positive electrode active material caused by charge/discharge and the positive electrode active material is likely to come off from the positive electrode current collector. On the other hand, if the value of b/a is more than 0.9, the thickness of the separator becomes too thick, and proportion of the positive electrode active material in the battery is decreased, thus battery capacity is decreased.

Where the ratio (b/a) which is the thickness (b) of the separator based on the thickness (a) of the layer containing the positive electrode active material formed on the positive electrode current collector is set in the range of 0.15 to 0.9 as mentioned above, the battery capacity is not decreased, and the expansion/shrinkage of the positive electrode active material caused by charge/discharge is sufficiently absorbed by the separator, thus exfoliation of the positive electrode active material from the positive current collector is prevented.

A non-aqueous electrolyte secondary battery according to a third aspect of the invention is provided with a positive electrode in which a layer containing positive electrode active material and binding agent is formed on a positive electrode current collector, a negative electrode, a separator interposed between the positive electrode and the negative electrode, and a non-aqueous electrolyte, wherein the positive electrode active material in the positive electrode is a mixture of lithium-manganese composite oxide having spinel structure represented by a general formula $Li_{1+z}Mn_2O_4$ (wherein a relationship $0 \leq z \leq 0.2$ is satisfied) and lithium-transition metal composite oxide represented by a general formula $LiNi_{1-x-y}Co_xMn_yO_2$ (wherein the relationships $0.5 < x+y < 1.0$ and $0.1 < y < 0.6$ are satisfied), and said binding agent is polyvinylidene fluoride, where proportion of the binding agent based on said positive electrode active material is in a range of 2 to 10 wt %.

Where, as suggested by the non-aqueous electrolyte secondary battery of the third aspect of the invention, the binding agent mixed with the positive electrode active material is the polyvinylidene fluoride and the proportion of the polyvinylidene fluoride based on the positive electrode active material is in the range of 2 to 10 wt %, battery capacity is not decreased by excess proportion of the binding agent based on the positive electrode active material, and degradation of flexibility of the layer containing the positive electrode active material is prevented for the effect of the polyvinylidene fluoride, thus exfoliation of the positive electrode active material from the positive current collector is prevented in spite of expansion/shrinkage of the positive electrode active material caused by charge/discharge.

The non-aqueous electrolyte secondary batteries of the first to third aspects of the invention preferably use lithium-nickel-cobalt-manganese composite oxide having a stable structure and represented by the general formula $LiNi_{1-x-y}Co_xMn_yO_2$ (wherein the relationships $0.5 < x+y < 1.0$, $0.2 < x < 0.9$, and $0.1 < y < 0.6$ are satisfied).

In the non-aqueous electrolyte secondary batteries of the first to third aspects of the invention, known non-aqueous electrolytes for use in the non-aqueous electrolyte secondary batteries may be used. Examples of the usable non-aqueous electrolyte include the non-aqueous electrolyte solution prepared by dissolving a solute in a non-aqueous solvent.

Known non-aqueous solvents and solutes which have been generally used may be used as said non-aqueous solvent and said solute.

Examples of the usable non-aqueous solvent include ethylene carbonate, propylene carbonate, butylene carbonate, dimethyl carbonate, ethyl methyl carbonate, diethyl carbonate, methyl propyl carbonate, ethyl propyl carbonate, methyl isopropyl carbonate, γ-butyrolactone, tetrahydrofuran, 2-methyltetrahydrofuran, 1,4-dioxane, and 1,2-dimethoxyethane. These solvents may be used alone or in combination of two or more types.

Examples of the usable solute include $LiPF_6$, $LiAsF_6$, $LiBF_4$, $LiCF_3SO_3$, $LiN(C_1F_{2l+1}SO_2)(C_mF_{2m+1}SO_2)$ (wherein 1 and m denote an integer more than 1), $LiC(C_pF_{2p+1}SO_2)(C_qF_{2q+1}SO_2)(CrF_{2r+1}SO_2)$ (wherein p, q, and r denote an integer more than 1).

These and other objects, advantages and features of the invention will become apparent from the following description thereof taken in conjunction with the accompanying drawings which illustrate specific embodiment of the invention.

DESCRIPTION OF THE PREFERRED EMBODIMENTS

The following examples specifically illustrate non-aqueous electrolyte secondary batteries according to the present invention. Further, comparative examples will be taken to make it clear that each of the non-aqueous electrolyte secondary batteries according to the examples are prevented from decrease in various characteristics after charge/discharge cycles. It should be appreciated that the non-aqueous electrolyte secondary batteries according to the present invention are not particularly limited to those in the following examples, and various changes and modifications may be made in the invention without departing from the spirit and scope thereof.

EXAMPLE A1

Figure 1:
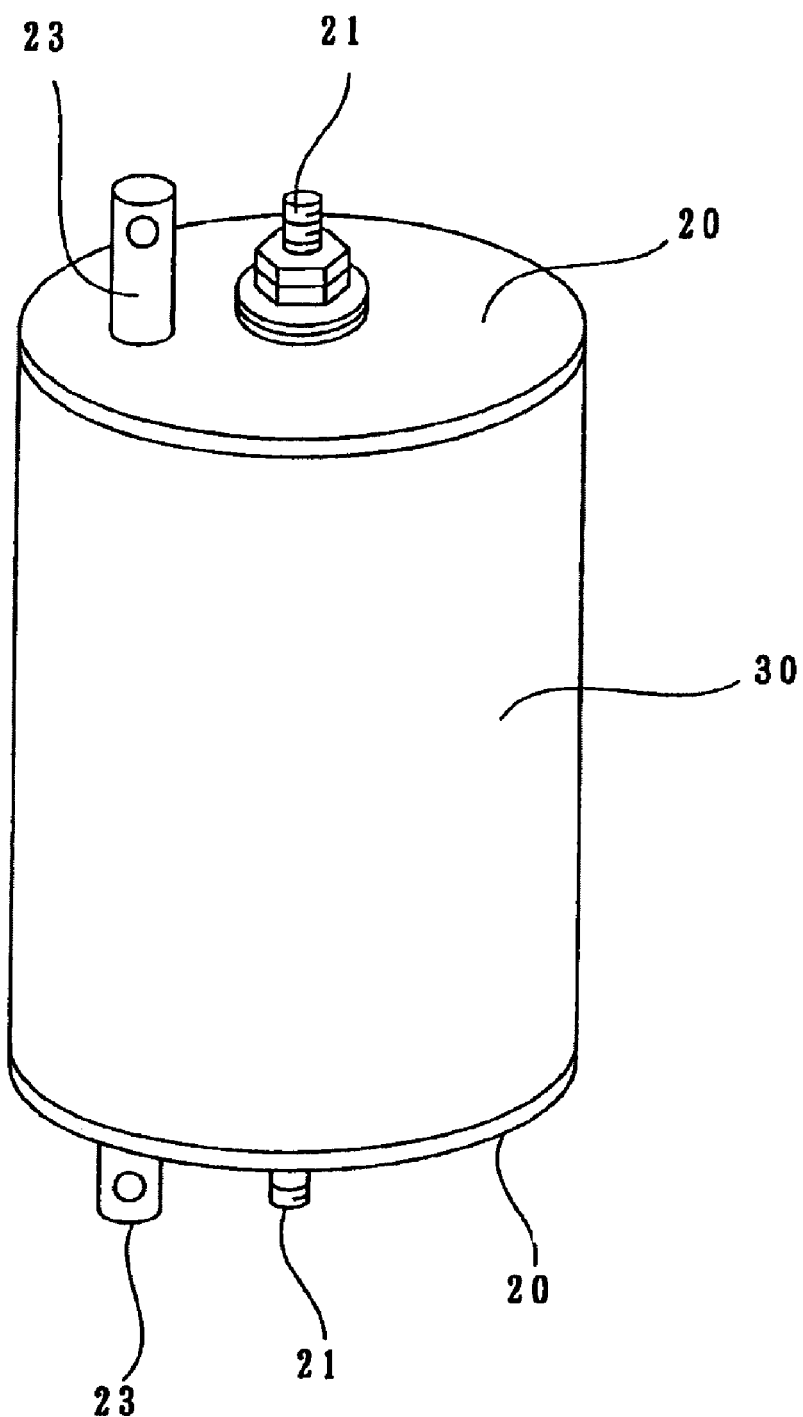
FIG. 1 is a schematic perspective view of a non-aqueous electrolyte secondary battery according to Examples and Comparative Examples of the present invention.

In Example A1, there were used a positive electrode and a negative electrode prepared in the following manners so as to fabricate a cylindrical non-aqueous electrolyte secondary battery as shown in FIG. 1.

(Preparation of Positive Electrode)

In the preparation of a positive electrode, a mixed aqueous solution containing nickel sulfate, cobalt sulfate, and manganese sulfate in a molar ratio of Ni:Co:Mn=4:3:3 was prepared. Sodium hydroxide was added to the mixed aqueous solution to obtain coprecipitation of hydroxides. The coprecipitation and lithium hydroxide were mixed in a molar ratio of 1:1, were heat treated in an oxygen atmosphere at 750 to 900° C. for 12 hours, and were ground to obtain lithium-nickel-cobalt-manganese composite oxide represented by a general formula $LiNi_{0.4}Co_{0.3}Mn_{0.3}O_2$ having an average partickel diameter of 8 μm.

Lithium hydroxide and manganese sulfate were mixed in the molar ratio of Li:Mn=1:2, were heat treated in the atmosphere at 800° C. for 20 hours, and were ground to obtain lithium-manganese composite oxide having spinel structure represented by the general formula $LiMn_2O_4$ having the average partickel diameter of 7 μm.

A mixture consisting of said $LiNi_{0.4}Co_{0.3}Mn_{0.3}O_2$ powder and said $LiMn_2O_4$ powder in a weight ratio of 6:4 was used as positive electrode active material.

The positive electrode active material, an artificial graphite powder as a conductive agent, and N-methyl-2-pyrolidone solution which is polyvinylidene fluoride as a binding agent were mixed in a weight ratio of 90:5:5 to prepare a slurry, which was applied to both sides of an aluminum foil as a positive electrode current collector by means of doctor blade coating method and then subject to vacuum drying at 150° C. for 2 hours and rolling so as to prepare the positive electrode. In the positive electrode thus prepared, thickness of a layer containing the positive electrode active material (a) was 45 µm.

(Preparation of Negative Electrode)

In the preparation of a negative electrode, hydrocarbon and graphite powder which was having a specific surface area of 7.7 m$^2$/g and bulk density of 0.37 g/cm$^3$ were contacted to each other in a heating state to coat a surface of the graphite powder with low crystalline carbon as negative electrode active material.

The negative electrode active material prepared by coating the surface of the graphite powder with the low crystalline carbon had an intensity ratio (IA/IB) which is an intensity (IA) of 1350/cm based on an intensity (IB) of 1580/cm, as measured by argon laser Raman, of 0.22. The specific surface area thereof was 6.5 m$^2$/g and the bulk density thereof was 0.40 g/cm$^3$.

The negative electrode active material and N-methyl-2-pyrolidone solution which is polyamide acid as the binding agent were mixed in the weight ratio of 99:1 to prepare the slurry, which was applied to both sides of a copper foil as a negative electrode current collector by means of the doctor blade coating method and then subject to vacuum drying at 340° C. for 2 hours and rolling so as to prepare the negative electrode. Filling density of the negative electrode active material in the negative electrode was 1.4 g/cm$^2$.

(Fabrication of Battery)

In the fabrication of a battery, ethylene carbonate and dimethyl carbonate were mixed in a volume ratio of 1:1 to prepare a mixed solvent, in which lithium hexafluorophosphate LiPF$_6$ as a solute was dissolved in a concentration of 1 mol/l to prepare a non-aqueous electrolyte solution. A porous polypropylene film having thickness of 30 µm was used as a separator.

Figure 2:
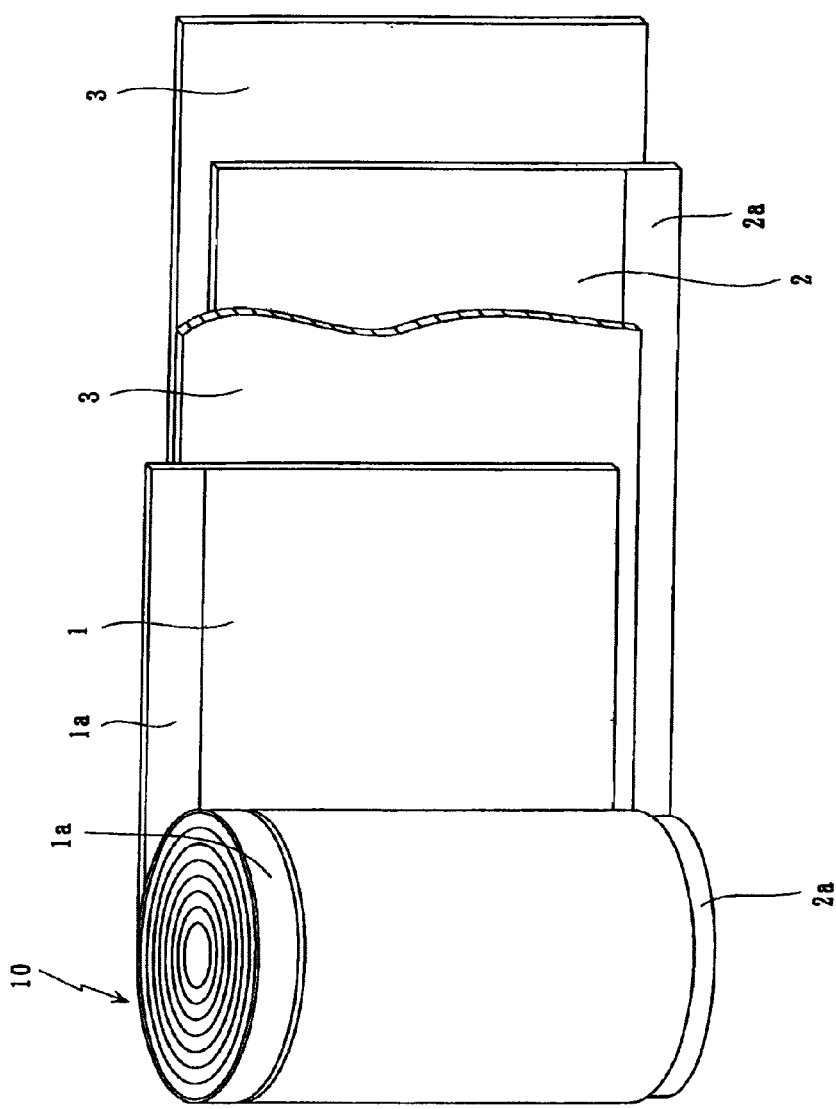
FIG. 2 is a schematic explanatory diagram showing a formation of an electrode body according to Examples and Comparative Examples of the present invention.

As shown in FIG. 2, the positive electrode 1 and the negative electrode 2 prepared in the above-mentioned manners were arranged to be shifted from each other in width direction, the separator 3 was interposed between the positive electrode 1 and the negative electrode 2, and they were spirally wound to form a electrode body 10. In one end of the electrode body 10, an edge of a positive electrode current collector 1a in the positive electrode 1 was exsert outside along an axis compared with the edge of the separator 3, while in another one end of the electrode body 10, the edge of a negative electrode current collector 2a in the negative electrode 2 was exsert outside along the axis compared with the edge of the separator 3.

Figure 3:
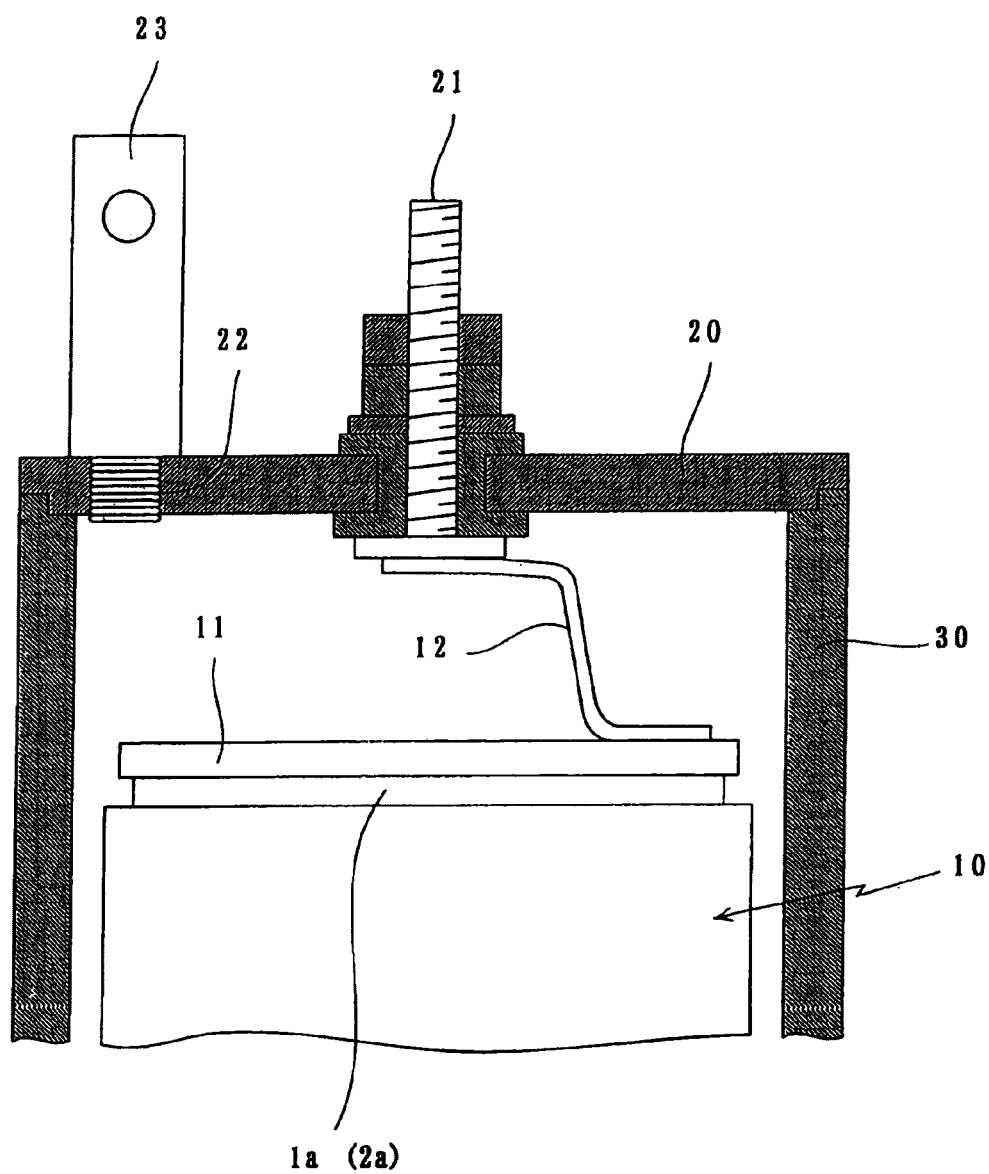
FIG. 3 is a explanatory cross section showing an internal structure of a non-aqueous electrolyte secondary battery according to Examples and Comparative Examples of the present invention.

Further, as shown in FIG. 3, in the electrode body 10, the positive electrode current collector 1a and the negative electrode current collector 2a which were exsert outside along the axis compared with respective edges of the separator 3 were respectively welded to current collecting plates 11, then respective leads 12 on the current collecting plates 11 were connected to respective electrode terminal mechanisms 21 installed in covers 20, after which the electrode body 10 was contained in a cylindrical body 30, and the covers 20 were welded and fixed to apertures of the cylindrical body 30.

The non-aqueous electrolyte solution was poured from pouring apertures 22 formed on the covers 20, and gas exhaust valves 23 were installed on the pouring apertures 22 so as to fabricate a cylindrical non-aqueous electrolyte secondary battery having a diameter of 40 mm and height of 90 mm as shown in FIG. 1. A ratio (b/a) which is thickness (b) of the separator based on the thickness (a) of the layer containing the positive electrode active material was 0.67.

COMPARATIVE EXAMPLE A1

In Comparative Example a1, in the preparation of the negative electrode of Example A1, graphite powder having a specific surface area of 5.5 m$^2$/g and bulk density of 0.44 g/cm$^3$ was used as the negative electrode active material. Except for the above, the same procedure as that in the Example A1 was taken to fabricate a non-aqueous electrolyte secondary battery of Comparative Example a1. The graphite powder had the intensity ratio (IA/IB) which is an intensity (IA) of 1350/cm based on an intensity (IB) of 1580/cm, as measured by argon laser Raman, of 0.16.

Each of the non-aqueous electrolyte secondary batteries of Example A1 and Comparative Example a1 thus fabricated was charged at a constant current of 1 A to 4.2 V, and was discharged at the constant current of 1.67 A to 3.0 V, so as to measure battery capacity of each of the non-aqueous electrolyte secondary batteries.

Each of the non-aqueous electrolyte secondary batteries which was thus charged at the constant current of 1 A to 4.2 V was discharged at the constant current of 1.67 A to half of the battery capacity so as to set depth of discharge (DOD) of the non-aqueous electrolyte secondary batteries 50%.

Then, each of the batteries was charged at the constant current of 5 A for ten seconds followed by suspension for five minutes, and was discharged at the constant current of 5 A for ten seconds to measure battery voltage thereof. Next, after another suspension for five minutes, each of the batteries was charged at the constant current of 20 A for ten seconds followed by suspension for five minutes, and was discharged at the constant current of 20 A for ten seconds to measure the battery voltage thereof. After further suspension for five minutes, each of the batteries was charged at the constant current of 40 A for ten seconds followed by suspension for five minutes, and was discharged at the constant current of 40 A for ten seconds to measure the battery voltage thereof.

Based on results of the discharge current I and the battery voltage V thus measured, I-V characteristics of the non-aqueous electrolyte secondary batteries of Example A1 and Comparative Example a1 was inspected to find resistance value Ro before cycles of each of the non-aqueous electrolyte secondary batteries based on slope of straight line thus inspected. The results were shown in the following Table 1.

Charge/discharge electric power in a range of 0 to 300 W having pulse width of 10 seconds was added to each of the non-aqueous electrolyte secondary batteries of Example A1 and Comparative Example a1, while the batteries were charged/discharged at the battery voltage in the range of 3.0 to 4.2 V at random for 500 hours. Further, each of the non-aqueous electrolyte secondary batteries was discharged at the constant current of 1.67 A to 3.0 V, was charged at the constant current of 1 A to 4.2 V, and was discharged at the constant current of 1.67 A to 3.0 V, to measure the battery capacity of each of the non-aqueous electrolyte secondary batteries.

Each of the non-aqueous electrolyte secondary batteries which was thus charged at the constant current of 1 A to 4.2 V was discharged at the constant current of 1.67 A to half of the battery capacity so as to set the depth of discharge (DOD) of the non-aqueous electrolyte secondary batteries 50%.

Then, in the same manner as mentioned above, each of the batteries was charged at the constant current of 5 A for ten seconds followed by suspension for five minutes, and was discharged at the constant current of 5 A for ten seconds to measure the battery voltage thereof. Next, after another suspension for five minutes, each of the batteries was charged at the constant current of 20 A for ten seconds followed by suspension for five minutes, and was discharged at the constant current of 20 A for ten seconds to measure the battery voltage thereof. After further suspension for five minutes, each of the batteries was charged at the constant current of 40 A for ten seconds followed by suspension for five minutes, and was discharged at the constant current of 40 A for ten seconds to measure the battery voltage thereof.

Based on the results of the discharge current I and the battery voltage V, I-V characteristics of the non-aqueous electrolyte secondary batteries of Example A1 and Comparative Example a1 after cycles was inspected to find the resistance value Rs after cycles of each of the non-aqueous electrolyte secondary batteries based on the slope of the straight line thus inspected, and to find resistance rise ratio (%) both before and after cycles by way of the following formula. The results were shown in the following Table 1.

Resistance rise ratio (%)=((Rs−Ro)/Ro)×100

TABLE 1

| | resistance value (mΩ) | | resistance rise ratio (%) |
| --- | --- | --- | --- |
| | before cycles | after cycles | |
| Example A1 | 4.6 | 4.7 | 2 |
| Comparative Example a1 | 4.5 | 5.0 | 11 |

As apparent from the results, the non-aqueous electrolyte secondary battery of Example A1 using the mixture of the lithium-manganese composite oxide having spinel structure and the lithium-nickel-cobalt-manganese composite oxide as the positive electrode active material in the positive electrode, and the graphite whose surface was coated with the low crystalline carbon as the negative electrode active material in the negative electrode presented a remarkably decreased resistance rise ratio and improved charge/discharge cycle characteristics compared with the non-aqueous electrolyte secondary battery of Comparative Example a1 using graphite as negative electrode active material in the negative electrode.

COMPARATIVE EXAMPLE A2

In Comparative Example a2, in the preparation of the positive electrode of Example A1, only the lithium-manganese composite oxide $LiMn_2O_4$ having the spinel structure and the average particle diameter of 7 μm was used as the positive electrode active material to prepare the positive electrode.

Figure 4:
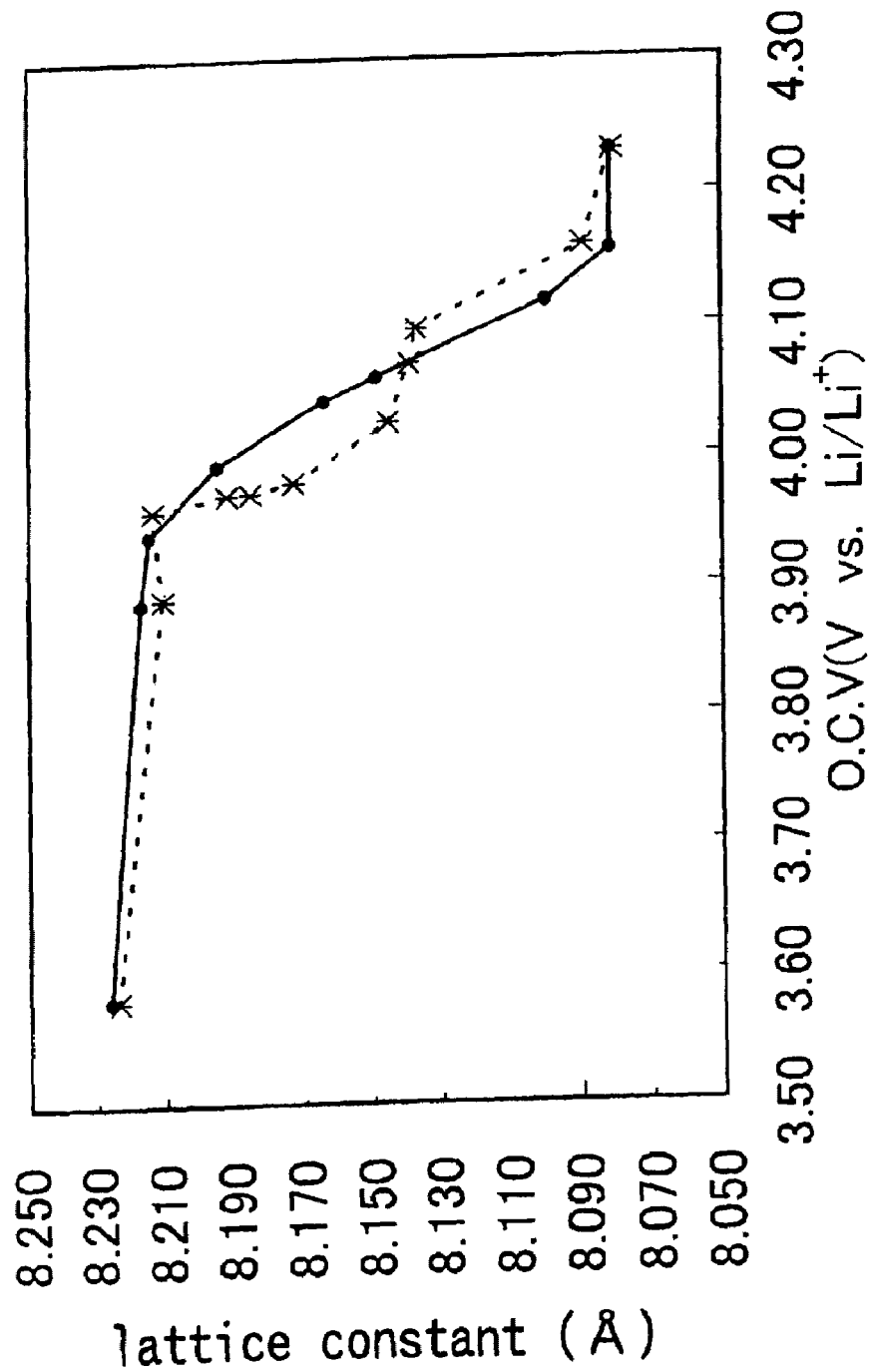
FIG. 4 is a graphical representation of a relationship between open circuit voltage OCV (V) and lattice constant (Å) of a positive electrode active material according to positive electrodes of Example A1 and Comparative Example a2.

A relationship between open circuit voltage OCV (V) and lattice constant (Å) of the positive electrodes prepared in Example A1 and Comparative Example a2 was inspected. The results were shown in the FIG. 4. In the FIG. 4, the results according to Example A1 were shown with and a solid line, and those according to Comparative Example a2 were shown with X and a broken line.

As a result, the positive electrode of Comparative Example a2 using only the lithium-manganese composite oxide having the spinel structure as the positive electrode active material presented two stages of change in the lattice constant, and crystal strain occurred in high voltage region of 3.9 to 4.2 V (vs. $Li/Li^+$). On the other hand, the positive electrode of Example A1 using the mixture of the lithium-manganese composite oxide having the spinel structure and the lithium-nickel-cobalt-manganese composite oxide as the positive electrode active material did not present the aforesaid two stages of the change in the lattice constant and the crystal strain was prevented, thus insertion and separation of lithium ions were smoothly carried out.

Where the above-mentioned positive electrode using only the lithium-manganese composite oxide having the spinel structure as the positive electrode active material was used in the fabrication of a non-aqueous electrolyte secondary battery of Comparative Example a2 and the aforesaid charge/discharge was carried out repeatedly, the crystal strain occurred in the positive electrode active material and the battery characteristics was degraded.

EXAMPLE B1

In Example B1, the mixture of the lithium-nickel-cobalt-manganese composite oxide represented by the general formula $LiNi_{0.4}Cu_{0.3}Mn_{0.3}O_2$ and the lithium-manganese composite oxide having the spinel structure represented by the general formula $LiMn_2O_4$ in a weight ratio of 6:4 was used as the positive electrode active material in the same manner as the Example A1.

The positive electrode active material, the artificial graphite powder as the conductive agent, and N-methyl-2-pyrolidone solution which is the polyvinylidene fluoride as the binding agent were mixed in the weight ratio of 90:5:5 to prepare the slurry, which was applied to both sides of the aluminum foil as the positive electrode current collector by means of the doctor blade coating method and then subject to the vacuum drying at 150° C. for 2 hours and rolling so as to prepare the positive electrode. In the positive electrode thus prepared, thickness of the layer containing the positive electrode active material (a) was 44 μm.

In the negative electrode, the same graphite powder as that in the Comparative Example a1 was used as the negative electrode active material. The negative electrode active material and N-methyl-2-pyrolidone solution which is the polyamide acid as the binding agent were mixed in the weight ratio of 99:1 to prepare the slurry, which was applied to both sides of the copper foil as the negative electrode current collector by means of the doctor blade coating method and then subject to vacuum drying at 340° C. for 2 hours and rolling so as to prepare the negative electrode.

Ethylene carbonate and dimethyl carbonate were mixed in the volume ratio of 1:1 to prepare the mixed solvent, in which lithium hexafluorophosphate $LiPF_6$ was dissolved in the concentration of 1 mol/l to prepare the non-aqueous electrolyte solution, and the porous polypropylene film having thickness of 30 μm was used as the separator, in the same manner as the Example A1.

A cylindrical non-aqueous electrolyte secondary battery having the diameter of 40 mm and the height of 90 mm as shown in FIG. 1 was fabricated in the same manner as the Example A1. In the non-aqueous electrolyte secondary battery of Example B1, the ratio (b/a) which is the thickness (b) of the separator based on the thickness (a) of the layer containing the positive electrode active material was 0.68.

The non-aqueous electrolyte secondary battery of Example B1 was charged at the constant current of 1 A to 4.2 V, and was discharged at the constant current of 1.67 A to 3.0

V, so as to measure the battery capacity of the non-aqueous electrolyte secondary battery. The battery capacity of the non-aqueous electrolyte secondary battery of Example B1 was 5 Ah.

COMPARATIVE EXAMPLE B1

In Comparative Example b1, in the preparation of the positive electrode of Example B1, the same mixture of the lithium-nickel-cobalt-manganese composite oxide and the lithium-manganese composite oxide was used as the positive electrode active material, while the positive electrode active material, the artificial graphite powder as the conductive agent, and polyvinylidene fluoride as the binding agent were mixed in the weight ratio of 94:5:1 to prepare the slurry, which was applied to both sides of the aluminum foil as the positive electrode current collector by means of the doctor blade coating method and then subject to vacuum drying at 150° C. for 2 hours and rolling so as to prepare the positive electrode.

Unfortunately, however, while rolling for the preparation of the positive electrode, the layer of the positive electrode active material came off from the positive electrode current collector, and the positive electrode was not prepared because of little amount of polyvinylidene fluoride as the binding agent.

COMPARATIVE EXAMPLE B2

In Comparative Example b2, in the preparation of the positive electrode of Example B1, the thickness of the layer containing the positive electrode active material formed on the positive electrode current collector (a) was changed to 160 μm, and the porous polypropylene film having the thickness of 20 μm was used as the separator. Except for the above, the same procedure as that in the Example B1 was taken to fabricate a cylindrical non-aqueous electrolyte secondary battery having the diameter of 40 mm and the height of 90 mm. The ratio (b/a) which is the thickness (b) of the separator based on the thickness (a) of the layer containing the positive electrode active material was 0.13.

When the non-aqueous electrolyte secondary batteries of the Example B1 and the Comparative Example b2 were repeatedly charged/discharged at the voltage between 3.0 V and 4.2V, the positive electrode active material of the non-aqueous electrolyte secondary battery of the Comparative Example b2 came off from the positive electrode current collector, thus the capacity after cycles thereof was extremely decreased compared with the non-aqueous electrolyte secondary battery of the Example B1.

COMPARATIVE EXAMPLE B3

In Comparative Example b3, in the preparation of the positive electrode of Example B1, the thickness of the layer containing the positive electrode active material formed on the positive electrode current collector (a) was changed to 31 μm. Except for the above, the same procedure as that in the Example B1 was taken to fabricate a cylindrical non-aqueous electrolyte secondary battery having the diameter of 40 mm and the height of 90 mm. The ratio (b/a) which is the thickness (b) of the separator based on the thickness (a) of the layer containing the positive electrode active material was 0.97.

The non-aqueous electrolyte secondary battery of Comparative Example b3 was charged at the constant current of 1 A to 4.2 V, and was discharged at the constant current of 1.67 A to 3.0 V, so as to measure the battery capacity of the non-aqueous electrolyte secondary battery in the same manner as the non-aqueous electrolyte secondary battery of Example B1. The battery capacity of the non-aqueous electrolyte secondary battery of Comparative Example b3 was about 20% decreased compared with the non-aqueous electrolyte secondary battery of Example B1.

Although the present invention has been fully described by way of examples, it is to be noted that various changes and modification will be apparent to those skilled in the art.

Therefore, unless otherwise such changes and modifications depart from the scope of the present invention, they should be constructed as being included therein.

What is claimed is:

1. A non-aqueous electrolyte secondary battery provided with a positive electrode, a negative electrode, a separator interposed between the positive electrode and the negative electrode, and a non-aqueous electrolyte, wherein
    positive electrode active material in said positive electrode is a mixture of
        lithium-manganese composite oxide having spinel structure represented by a general formula $Li_{1+z}Mn_2O_4$ wherein $0<z<0.2$ is satisfied, and
        lithium-transition metal composite oxide represented by the general formula $LiNi_{1-x-y}Co_xMn_yO_2$ wherein $0.5<x+y<1.0$ and $0.1<y<0.6$ are satisfied; and
    negative electrode active material in said negative electrode is graphite coated with low crystalline carbon where whole or a part of a surface of first graphite material as a substrate is coated with second carbon material which is lower in crystallinity compared with the first graphite material.

2. The non-aqueous electrolyte secondary battery according to claim 1, wherein said negative electrode active material has an intensity ratio (IA/IB) which is an intensity (IA) of 1350/cm based on an intensity IB of 1580/cm, as measured by argon laser Raman, in a range of 0.2 to 0.3.

3. The non-aqueous electrolyte secondary battery according to claim 1, wherein the separator is interposed between said positive electrode and said negative electrode, and these are wound.

4. A non-aqueous electrolyte secondary battery provided with a positive electrode in which a layer containing positive electrode active material is formed on a positive electrode current collector, a negative electrode, a separator interposed between the positive electrode and the negative electrode, and a non-aqueous electrolyte, wherein
    said positive electrode active material is a mixture of
        lithium-manganese composite oxide having spinel structure represented by a general formula $Li_{1+z}Mn_2O_4$ (wherein $0<z<0.2$ is) satisfied, and
        lithium-transition metal composite oxide represented by a general formula $LiNi_{1-x-y}Co_xMn_yO_2$ (wherein $0.5<x+y<1.0$ and $0.1<y<0.6$ are) satisfied; and
    a ratio (b/a) which is thickness (b) of said separator based on the thickness (a) of the layer containing said positive electrode active material is in a range of 0.15 to 0.9.

5. The non-aqueous electrolyte secondary battery according to claim 4, wherein negative electrode active material in said negative electrode is carbon material.

6. The non-aqueous electrolyte secondary battery according to claim 5, wherein said carbon material as the negative electrode active material is graphite coated with low crystalline carbon where whole or a part of a surface of first graphite material as a substrate is coated with second carbon material which is lower in crystallinity compared with the first graphite material.

7. The non-aqueous electrolyte secondary battery according to claim 4, wherein the separator is interposed between said positive electrode and said negative electrode, and these are wound.

8. A non-aqueous electrolyte secondary battery provided with a positive electrode in which a layer containing positive electrode active material and binding agent is formed on a positive electrode current collector, a negative electrode, a separator interposed between the positive electrode and the negative electrode, and a non-aqueous electrolyte, wherein said positive electrode active material is a mixture of lithium-manganese composite oxide having spinel structure represented by a general formula $Li_{1+z}Mn_2O_4$ (wherein $0 z<0.2$ is) satisfied, and lithium-transition metal composite oxide represented by a general formula $LiNi_{1-x-y}Co_xMn_yO_2$ (wherein $0.5<x+y<1.0$ and $0.1<y<0.6$ are) satisfied;

negative electrode active material in said negative electrode is carbon material that is graphite coated with low crystalline carbon where whole or a part of a surface of first graphite material as a substrate is coated with second carbon material which is lower in crystallinity compared with the first graphite material said binding agent is polyvinylidene fluoride; and proportion of the binding agent based on said positive electrode active material is in a range of 2 to 10 wt%.

9. The non-aqueous electrolyte secondary battery according to claim 8, wherein the separator is interposed between said positive electrode and said negative electrode, and these are wound.

* * * * *

UNITED STATES PATENT AND TRADEMARK OFFICE
CERTIFICATE OF CORRECTION

PATENT NO.      : 7,217,475 B2
APPLICATION NO. : 10/682297
DATED           : May 15, 2007
INVENTOR(S)     : Naoya Nakanishi et al.

It is certified that error appears in the above-identified patent and that said Letters Patent is hereby corrected as shown below:

Claims

Please change "$0<z<0.2$" into --$0 \leq z \leq 0.2$-- on Column 12, line 23 and 51 and Column 13, line 14.

Signed and Sealed this

Sixteenth Day of October, 2007

JON W. DUDAS
*Director of the United States Patent and Trademark Office*